United States Patent Office 3,658,761
Patented Apr. 25, 1972

3,658,761
PROCESS FOR PREPARING HYDROLYZATES OF ACYLOXYCAPROIC ACID AND ALKLYHYDROXYCAPROATE AND POLYURETHANES MADE THEREFROM
Fritz Hostettler, Verona, and Frank G. Lombardi, Clifton, N.J., assignors to Inter-Polymer Corporation, Passaic, N.J.
No Drawing. Continuation of application Ser. No. 715,164, Mar. 22, 1968. This application Apr. 13, 1970, Ser. No. 28,174
Int. Cl. C08g 22/10, 17/017
U.S. Cl. 260—77.5 AN           7 Claims

ABSTRACT OF THE DISCLOSURE

There is disclosed a process for the production of polyurethanes from 6-acyloxycaproic acids and alkyl 6-hydroxycaproates, comprising converting the 6-acyloxycaproic acids- or alkyl 6-hydroxycaproates by hydrolysis to mixtures of the corresponding 6-hydroxycaproic acids and oligomers thereof, the hydrolysis reactions being conducted in the presence of water, and preferably in the presence of a hydrogen ion containing catalyst that is readily removable from the hydrolysate; removing the acyloxy acids or alkanols, for example, formic acid or methanol, which are formed during the hydrolysis reaction, converting the acid hydrolysate to a polyester polyol by reaction with an organic polyfunctional agent and thereafter converting the polyester polyol to a polyurethane.

CROSS REFERENCE TO OTHER APPLICATION

This application is a continuation of Ser. No. 715,164, filed Mar. 22, 1968 and now abandoned.

SUMMARY OF THE INVENTION

Field of the invention

This invention relates to improved polyurethanes having excellent properties, methods for their production from intermediate products comprising mixtures of 6-hydroxycaproic acid and oligomers thereof and methods for the production of the intermediate products.

Description of the prior art

It is known that polyester polyols can be reacted with polyisocyanates to produce polyurethanes, which products are widely used in a number of areas such as mechanical components in a variety of industries including the automotive industry. However a need remains in the art for low cost, readily available starting materials from which the intermediate polyester polyols may be prepared for further reaction in forming such polyurethanes.

It is generally known and acknowledged that polyester polyols can be prepared by reacting epsilon-caprolactones with polyols and that the polyester polyols in turn can be reacted with polyisocyanates and, if desired, compounds such as polyols, water, polyamines, amino alcohols and the like to form polyurethane elastomers, coatings, and foams.

It is also known that epsilon-caprolactones may be prepared by various methods. For example, in one method, epsilon-caprolactones may be prepared by the oxidation of cyclohexanones with organic peroxides (see for example, U.S. Pat. Nos. 2,904,584 and 3,064,008; J. Am. Chem. Soc. 80, 4079, 1958; 71, 2571, 1949; 77, 188, 1955; and Helv. Chim. Acta. 32, 973, 1949). Moreover, cyclohexanones and aldehydes may be co-oxidized with oxygen or an oxygen-containing gas in the presence of a metallic catalyst to form epsilon-caprolactones, adipic acid and 6-acyloxycaproic acids (U.S. Pat. No. 3,025,306). Furthermore, U.S. Pat. No. 2,904,584 proposes a process for the oxidation of cyclohexanone with peracetic acid, prepared by the action of hydrogen peroxide with acetic acid, in the presence of an acidic cation exchange resin. The resulting product mix consists of a mixture of 6-acetoxycaproic acid, 6-hydroxycaproic acid and adipic acid. Also, French Pat. No. 1,368,139 describes the oxidation of cyclohexanone with hydrogen peroxide in the presence of formic acid to result in a product consisting predominantly of 6-formyloxycaproic acid.

Although in several of the above patents and literature references, substantial quantities of epsilon-caprolactones are formed, it has also been observed that substantial quantities of 6-acyloxycaproic acids, or oligomers thereof, are formed. In some instances, for example according to French Pat. 1,368,139 or U.S. Pat. 2,904,584, 6-acyloxycaproic acids may be the main products. Methods for the conversion of these acids or oligomer acids to epsilon-caprolactones have been described, for example, in Belgian Pat. Nos. 693,971; 693,131 and 700,491. However, these methods require large amounts of catalyst and represent difficult and expensive operating procedures.

It has further been proposed to convert the 6-acyloxycaproic acids to polyesters by heating said acids in the presence of a small quantity of a strong acid (see French Pat. No. 1,400,437). Unfortunately, polyesters of this type contain a substantial amount of end-blocked, non-reactive end-groups, or carboxyl end-groups, both of which are undesirable for subsequent reaction with isocyanates. Furthermore the remaining strong acids in such polyesters have an undesirable decelerating effect upon subsequent isocyanate reactions. Consequently, polyesters have an undesirable decelerating effect upon subsequent isocyanate reactions. Consequently, polyesters prepared in this manner have not been found suitable for conversion to polyurethane elastomers, coatings, and foams. Still other methods, for example that disclosed in French Pat. No. 1,368,139, describes the conversion of 6-acyloxycaproic acids by means of alcoholysis reactions to alkyl 6-hydroxycaproates which in turn can be utilized for the formation of epsilon-caprolactone or for the synthesis of derivatives of 6-hydroxycaproic acids.

In all of the above described processes, however, the art, in producing polyester polyols for ultimate use in the formation of polyurethane elastomers, has been generally uniform in employing as basic starting materials ring lactones and particularly epsilon-caprolactones. In reviewing the above-described art processes, it will be appreciated that all are involved with new routes for the production of epsilon-caprolactones. Therefore it is well recognized that a need remains in the art by which polyurethanes may be prepared through polyester polyol intermediates wherein there could be employed as starting materials compounds other than epsilon-caprolactones, but which would still provide good quality polyester intermediates and polyurethane final products.

SUMMARY OF THE INVENTION

It is accordingly one object of the present invention to provide a process for the preparation of polyurethanes from polyester polyols which overcome or otherwise mitigate the problems of the prior art.

A further object of the present invention is to provide a procedure wherein polyurethanes are prepared from polyester polyols produced by the reaction of a mixture of 6-hydroxycaproic acids and oligomers thereof and organic polyfunctional agents.

A still further object of the invention is to provide a procedure for the production of a mixture of 6-hydroxycaproic acids and oligomers thereof.

Other objects and advantages of the present invention will become apparent as the description thereof proceeds.

In satisfaction of the foregoing objects and advantages there is provided by the process of this invention a procedure for the preparation of polyurethane elastomers having excellent properties which comprises producing a mixture of hydroxycaproic acids and oligomers thereof by (1) hydrolysis of the corresponding 6-acyloxycaproic acid with water or (2) hydrolysis of the corresponding alkyl 6-hydroxycaproate with water, reacting said mixture of 6-hydroxycaproic acid and oligomers with an organic polyfunctional agent and mixtures of such agents, to produce polyester polyols and thereafter reacting the polyester polyols with polyisocyanates to produce the polyurethanes. Also provided by the process of the present invention are the products resulting from these processes.

DESCRIPTION OF THE PREFERRED EMBODIMENTS

As pointed out, this invention is primarily concerned with the direct use of 6-acyloxycaproic acids and alkyl 6-hydroxycaproates for the formation of 6-hydroxycaproic acids and oligomers thereof, which mixtures are, in turn, converted to polyester polyols or polyester polycarboxylic acids eminently suitable for subsequent reaction with polyisocyanates or polyepoxides without proceeding through the rather costly procedure of first producing epsilon-caprolactones. The invention essentially consists of hydrolyzing 6-acyloxycaproic acids or alkyl 6-hydroxycaproates to the corresponding 6-hydroxycaproic acids by means of water, removing the volatile acyloxy acid or alkanol and reacting the resulting hydrolysate, consisting essentially of 6-hydroxycaproic acids and oligomers thereof, with organic polyfunctional agents such as polyols, polyamines, polycarboxylic acids, amino alcohols or mixtures of the same to prepare polyester intermediates having substantially hydroxyl or carboxyl end-groups, the polyester intermediate being essentially devoid of end-groups other than hydroxyl or carboxyl which fact ultimately reflects in the achievement of superior physical properties in the urethane and/or epoxy end-products ultimately produced by the process of this invention.

As indicated, the starting materials employed in the process of the present invention comprise 6-acyloxycaproic acids or alkyl 6-hydroxycaproates. The 6-acyloxycaproic acids may be described by the general formula:

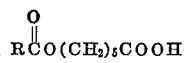

wherein R is hydrogen or lower alkyl such as methyl, ethyl, propyl, isopropyl, butyl, pentyl, hexyl, etc. Preferred materials of this type are those wherein R is hydrogen or methyl. The lower alkyl substituted derivatives are also included within the scope of the invention.

The 6-hydroxycaproates generally comprise the lower alkyl esters of 6-hydroxycaproic acid and may be depicted by the formula:

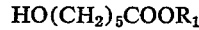

wherein $R_1$ is lower alkyl such as methyl, ethyl, propyl, isopropyl, butyl, etc. of which methyl is preferred. The lower alkyl substituted derivatives may also be employed.

It is generally known that 6-acyloxycaproic acids are susceptible to hydrolysis. However in the present invention, it has been found that, upon heating 6-acyloxycaproic acids with water, eventually an equilibrium state is reached in which water, acyloxy acids, non-hydrolyzed 6-acyloxycaproic acids, 6-hydroxycaproic acids and various oligomers thereof are, in general, present. The concentration of each component at equilibrium depends upon the initial ratio of water and 6-acyloxycaproic acid, as well as on the temperature and other variants of the reaction. It has been found that by continuously removing the hydrolyzed acyloxy acids, the equilibrium may be gradually shifted during the reaction until essentially all acyloxy acids are removed and all the 6-acyloxycaproic acids are hydrolyzed. The remaining hydrolysate will be found to comprise water, 6-hydroxycaproic acids and oligomers of 6-hydroxycaproic acid.

As will the hydrolysis of the 6-acyloxycaproic acid, it has also been discovered that hydrolysis of alkyl 6-hydroxycaproates proceeds in a similar fashion in the presence of water. In this reaction, the resulting alkanol is continuously removed to result in the desired mixtures of 6-hydroxycaproic acids and the various oligomers thereof.

It has surprisingly been found that these mixtures of 6-hydroxycaproic acids and the oligomers thereof may be directly reacted with organic polyfunctional agents as described hereinafter to produce polyester polyols which may then be used to form polyurethanes as disclosed herein. Thus as the 6-hydroxycaproic acids and various oligomers may be employed in admixture, the process of the present invention results in a procedure which obviates expensive separation or purification requirement of the prior art. In fact, according to the present invention, it is preferred that the 6-hydoxycaproic acids and oligomers not be separated before formation of the polyesters.

A further advantage in the use of these starting material mixtures is that the mixture will react with the organic polyfunctional agents to produce the polyester polyols without the necessity of metal polyesterification catalysts and thereby do not suffer from the fact that the resulting products will contain small amounts of metal catalysts or metal impurities. It is known in the art that when the polyester polyol does not contain metal impurities, the resulting polyurethane product will exhibit better oxidation resistance and humid aging, thus resulting in a more satisfactory and uniformly desirable polyurethane elastomer.

The hydrolysis procedure is carried out by reaction of the 6-acyloxycaproic acid or alkyl 6-hydroxycaproate with water in the presence or absence of an acid catalyst. The reaction is conducted under conditions such that the acyloxy acids or alkanols formed during the reaction are removed, preferably as formed, in order to shift the equilibuim of the reaction and result in the formation of the desired 6-hydroxycaproic acid/oligomer mixture. The acyloxy acids or alkanols are, for example, conveniently removed by means of distillation as azeotropes in the manner described hereinafter.

Thus according to the present invention it has been found that the desired hydrolysis, i.e. reaction of a 6-acyloxycaproic acid, a term intended herein to include the lower acyloxy esters of 6-hydroxycaproic acid and lower alkyl-substituted 6-hydroxycaproic acids, individually or in admixture with one another and the alkyl 6-hydroxycaproates, can be favored to the practical exclusion of remaining unreacted 6-acyloxycaproic acids or alkyl 6-hydroxycaproates by continually removing the lower acyloxy acid or alkanol or, alternatively, by removing said lower acyloxy acid or alkanol while there is still sufficient water present in the reaction mixture to assure complete hydrolysis of substantially all 6-acyloxycaproic acids.

By lower acyloxy acids it is meant, by way of example, formic acid, acetic acid, propionic acid, butyric acid and the like. Thus where the 6-acyloxycaproic acid to be hydrolyzed is 6-formyloxycaproic acid, the acid to be removed is formic acid; where the starting material is 6-acetoxycaproic acid, the acid removed is acetic acid, and so forth as the alkyl chain of the acid increases. The formyloxy and acetoxy derivatives are preferred. In the hydrolysis reaction of the alkyl 6-hydroxycaproates: methanol would be removed in hydrolysis of methyl 6-hydroxycaproate: ethanol would be removed in the hydrolysis of ethyl 6-hydroxycaproate and so forth as with the 6-acyloxy starting materials. The methyl derivative is preferred.

The hydrolysis reactions may be conducted in the presence or absence of catalysts. However it has been found advantageous to conduct the reactions in the presence of catalytic amounts of hydrogen ion type catalytic reagents and most preferably, strongly acidic catalysts. A typical catalyst which is very useful because it can be most easily separated from the reaction mixture by physical means from the hydrolysates formed, is a strongly acidic cation exchange resin at least partially in the hydrogen form, generally contains sulfonic acid groups and which is otherwise inert to the reaction mixture. The catalyst that is most universally useful and therefore preferred in the hydrolysis because it is most easily separated, by simple physical means, from the mixtures formed, is a strongly acidic cation exchange resin that is at least partially in the hydrogen form and generally contains sulfonic or phosphoric acid groups. The preferred cation exchange resins include heat-resistant, sulfonated synthetic resins having a cross-linked polystyrene matrix, such as, for example, the cation exchange resins sold under the trademarks Amberlite IR–120H, Dowex 50 and Duolite C–25. Even more preferred are resins specially recommended for elevated temperature usage, such as Amberlite 200. Essentially all cation exchange resins of this type are operable catalysts.

When a resin is used as the catalyst, it may be simply added to, intimately admixed with or dispersed in the initial reaction mixture, e.g., by agitation. The concentration of resin in the reaction mixture is not critical and can be adjusted to any level required to achieve a preselected rate of hydrolysis under preselected conditions, such as the molar ratio of ester to water, the temperature, the degree of agitation, and identity and particle size of the cation exchange resin. As a guide, as little as two grams of cation exchange resin per gram-mol of ester is usually sufficient to bring about rapid hydrolysis at the elevated temperature indicated.

The cation exchange resin normally is not damaged in the hydrolysis reaction, and may be recovered by simple filtration of the reaction mixture and reused in subsequent batch-type hydrolysis reactions.

It is also feasible to employ for the hydrolysis other acidic catalysts which are sufficiently volatile to codistill with water from the reaction mixture in the course of the subsequent polyesterification reaction and are effectively removable in this manner during preparation of the polyester rather than in a separate processing step subsequent to hydrolysis and prior to polyester preparation. These other catalysts, which may be used alone or in combination with a cation exchange resin, include strong, volatile acids, such as hydrogen chloride and trifluoroacetic acid, which do not form stable esters with hydroxylic compounds present in the polyester reaction mixture. These acids are used in the same manner as the cation exchange resins.

As indicated, it has been found that the above hydrolysis may also be conducted without a catalyst although the reaction proceeds at a much slower rate. Strong acids other than the above-employed ion-exchange resins may also be utilized as indicated. However, it is more desirable to utilize a volatile strong acid since the hydrolysate is thereafter utilized in the preparation of polyesters. It has been observed that addition of about 0.1 to 0.3% by weight of HCl based upon the mixture to be hydrolyzed results in a rate of hydrolysis which is even better than that observed with an ion-exchange resin. With the ion-exchange resin the total time for the reaction will be about 24 hours.

The reactions are generally conducted over a temperature range of about 100° C. up to about 300° C., preferably 110° C. to 150° C. although it is to be appreciated that the time required for the hydrolysis reactions normally may be reduced by increasing the temperature, by increasing the proportion of water employed, or by addition of the catalyst. Thus for every 10° rise in temperature, the rate of the reaction will about double.

In conducting the reaction, it is convenient to use a moderate excess of water together with an elevated temperature, for example, at least up to 150° C., or higher if super-atmospheric pressure is employed. As indicated in this regard, while the reaction can be conducted in the absence of catalyst, the hydrolysis of the 6-acyloxycaproic acids and alkyl 6-hydroxycaproates can be accelerated by the presence of the catalysts indicated.

The hydrolysis of the alkyl 6-hydroxycaproates is preferably accomplished under conditions similar to the hydrolysis of the 6-acyloxycaproic acids, i.e. at temperature from 100° C. or lower to 300° C. or higher although at higher temperatures, superatmospheric pressure is preferably employed.

The hydrolysis is conducted employing from about 0.1 to 5 moles or more, preferably from 0.5 to 2.0 moles, of water per mole of 6-acyloxycaproic acid or alkyl 6-hydroxycaproate. As indicated, while the preferred temperature ranges from about 110° C. to 150° C. for hydrolysis of the 6-acyloxycaproic acids, in the presence of water (part of which may be added as steam), it is also quite convenient to conduct the hydrolysis at higher temperatures, for example from 150 to 300° C. or even higher under superatmospheric pressure in the presence of steam. When low pressure steam is utilized (for example steam pressures of 70 to 180 p.s.i.), the reaction can, for example, be conducted conveniently at temperatures from 150 to 180° C. or somewhat higher.

In conducting the above reactions it has been found that when using large amounts of the water there will result a higher production of the monomers. Using smaller amounts of the hydrolysis reagent will result in larger amounts of the oligomers. Therefore while it is usually desirable that the monomers be obtained predominantly, the reaction may be conducted using only small amounts of the hydrolysis reagents as the resulting mixture of products may be used without separation.

As indicated above, the acids from hydrolysis of the 6-acyloxycaproic acids, produced during the reactions, should be removed periodically or continuously to drive the equilibrium reaction to completion. In hydrolyzing the lower members of the series, i.e. 6-formyloxycaproic acid and 6-acetoxycaproic acid, it has been found that the formic acid or acetic acid resulting therefrom can be removed conveniently as an azeotrope with the water being removed from the system. Moreover, these acids can also be effectively removed by means of steam distillation when conducting the reaction in this manner.

With the higher acids however, e.g. propionic, butyric, etc., which do not form azetropes with water, it has been found convenient to add a hydrocarbon such as benzene, toluene, xylene, ethyl benzene, etc. to form a ternary azeotrope with the acid and water and remove the acid in this manner.

In the hydrolysis reaction wherein the alkyl 6-hydroxycaproates are converted to 6-hydroxycaproic acids with the production of alcohols, it has been found that these alcohols, which are generaly low-boiling, can be effectively removed by permitting them to merely distill over with the water or by steam distillation. In this embodiment, the methyl esters are especially preferred with methanol being removed.

In addition to the above however, it is to be understood that any other suitable means may be employed for removing the acids and alcohols produced during the reaction, either periodically or continuously.

With respect to the removal of the acids and alcohols, it should be understood that the removal is necessary in order to drive the reaction to completion. Thus, in the hydrolysis of 6-formaloxycaproic acid, which forms the most preferred embodiment of the present invention, the hydrolysis reaction which occurs, as represented by the following equation:

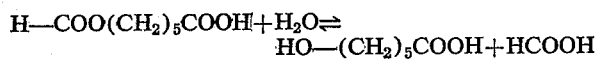

is not entirely quantitative unless the resulting formic acid is removed.

It is also to be understood that during this hydrolysis reaction, dimers of 6-hydroxycaproic acid such as those of the formula:

as well as higher oligomers, are also formed by condensation of 6-hydroxycaproic acid with itself or with 6-formyloxycaproic acid. Where alkyl-substituted starting materials are employed, it is to be understood that corresponding lower alkyl-substituted derivatives are formed in the reaction. In this regard, the amounts of dimer and higher oligomer formation will depend upon the concentration of water, reaction temperature, catalysts and other variables in the process.

With respect to use of the 6-hydroxycaproic acids with their oligomers in admixture, it has been observed that in many practical instances, the prescence of substantial proportions of the lower hydroxyacid oligomers in the hydrolyzate, which is employed in preparation of a polyester polyol, has no measurable deleterious effects on the properties of polyurethanes prepared from the polyester polyol described hereinafter.

The basic 6-acyloxycaproic acids employed as starting materials in the process of the present invention may be prepared as described hereinabove with respect to the prior art or in any other desired manner. The lower alkyl 6-hydroxy-caproates may be synthesized by alcoholysis of epsilon-caprolactones, 6-acyloxycaproic acids or by any other desired method.

In the second stage of the present process for preparing the polyester polyurethanes, the hydrolysates prepared in the manner described above are converted to polyester polyols. It is of particular importance and in fact is one of the decided advantages of the present process, that the 6-hydroxycaproic acids need not be isolated in pure state from the hydrolysate prior to conversion to a polyester polyol suitable for the manufacture of urethane elastomers exhibiting outstanding performance. Isolation of 6-hydroxycaproic acid is an expensive and difficult process as was shown previously. For this reason it has been suggested in the prior art that the 6-acyloxycaproic acids be converted to epsilon-caprolactones prior to conversion to polyesters suitable for manufacture of urethane elastomers. However, the present invention clearly demonstrates that the oligomer mixtures with the 6-hydroxycaproic acids can be utilized as starting materials for the preparation of polyester polyols which are eminently suitable for the manufacture of polyurethanes.

As indicated above, a further advantage of the hydrolysis is that it provides a simple and effective means for quantitative conversion of the esters, to useful mixtures of the corresponding 6-hydroxycaproic acids and their lower oligomers, which are of particular advantage in preparation of polyester polyols, which in turn are especially useful for manufacture of a variety of polyurethanes. The hydrolyzates which can be made as described in the absence of metal-containing catalyst remnants, makes unnecessary difficult and expensive procedures for removing such impurities therefrom prior to further use. In the case of cast polyurethane elastomers for example, it has been found desirable to utilize a processing technique wherein essentially no metallic impurities are present in the polyester polyol product which is reacted with the polyisocyanate. Furthermore, the hydrolyzates of the invention facilitate preparation of polyester diol intermediates having broader molecular weight distributions than polyesters diols prepared heretofore. Such broader molecular weight distribution in turn has the advantage of imparting to polyurethane elastomers made from such polyester diols, superior properties, such as low temperature performance and ultimate tensile strength.

As pointed out above the second stage in the process for preparing polyester polyurethanes, comprises converting the hydrolysates prepared in the manner described above to polyester polyols. For this purpose, the hydrolysate mixture is contacted with an organic polyfunctional agent, such as a polyol, polyamine or amino-alcohol, to control the functionality of the polyester polyol.

At this time, polyester diols and triols formed by reaction of the 6-hydroxycaproic acid and oligomers with aliphatic diol- and triol agents are considered to be the most useful. The polyester diols of 500–3000 molecular weight are of special importance because of the broad spectrum of high-performance polyurethane products which can be prepared therefrom. These end products include foams and micro-cellular elastomers, coatings, synthetic leather, and solid elastomers formed by casting, injection molding, transfer molding, extrusion, etc.

The most useful diol reactants include ethylene glycol; diethylene glycol, triethylene and higher polyethylene glycols; propylene glycol and its higher homologues; 1,3-propanediol; tetra-, penta- and hexamethylene glycols; 1,2,2,3- and 1,3-butanediols; neopentylene glycol; 2-ethyl-2-methyl-1,3-propanediol; 1,4-cyclohexanediols; cis- and trans-1,4-cyclohexanedimethanol; 1,4-bis(hydroxymethyl) benzene and the like.

Other potentially useful reactants, both di- and polyfunctional, include glycerol; 1,1,1-trimethylolpropane; 1,1,1,-trimethylolethane; monoethanolamine and diethanolamine; N-methylethanolamine; pentaerythritol and di-pentaerythritol; sorbitol; a methyl-D-glucopyranoside; sucrose; phenylene, tolylene, and xylylenediamines; diaminodiphenylmethanes; 1,2- and 1,3-propanediamine; ethylenediamine; hexamethylenediamine; isopropanolamine; diisopropanolamine; 1,2,4- and 1,2,6-hexanetriol, and the like.

The polycondensation of the 6-hydroxycaproic acid mixture with a diol, triol, amine or other suitable active hydrogen compounds so as to yield a polyester polyol, is basically a very simple process. However, inasmuch as the polyester is to be used in preparation of a polyurethane end product, it is normally desirable and often necessary to obtain a polyester of very low acid number, for example less than 2.0. This acid number value corresponds to a carboxylic acid equivalent weight of about 28,000. The higher the hydroxyl equivalent weight of the polyester polyol being prepared, the more difficult it becomes to reduce the acid number to 2.0 or less. The easiest solution involves the use of an esterification catalyst together with means for removing the water of condensation (since the reaction is reversible).

However an advantage of utilizing these hydrolysates for the manufacture of polyester polyols consists of the observation that the polyesterification reaction can be conducted in the absence of a polyesterification catalyst. This is particularly desirable in case these compounds are to be utilized in the manufacture of cast urethane elastomers, coatings, or in the manufacture of prepolymers where long pot-life and storage stability are of importance. Since polyesterification catalysts are oftentimes metallic compounds, such catalyst residues will normally catalyze the subsequent isocyanate reaction with the result of vastly reduced pot-life or prepolymer stability. However, for other urethane applications, such as foams, one-shot casting resins, and the like, it is entirely permissible to utilize polyesterification catalysts.

When the polycondensation is carried out without use of a catalyst, the problem of water removal and driving the reaction to completion within a practical reaction period is met by utilization of more special processing conditions. It has been found that a high final reaction temperature (180°–240° C.) together with one or more of the following techniques usually results in a low acid number at hydroxyl equivalent weights of 1,000 or more:

(1) Vacuum stripping of water (at 10 mm. Hg or less)
(2) Azeotropic distillation of water (with toluene, benzene or xylene)
(3) Codistillation of water with excess polyol via vacuum stripping.

Generally a polyester polyol is prepared by charging to the reaction vessel the predetermined quantities of crude hydroxycaproic acid and active hydrogen compounds, calculated according to theory, excess active hydrogen compound being charged to the reaction vessel if technique (3) above is to be used. The vessel should be equipped with an agitator, means for heating, thermometer, nitrogen inlet, and apparatus for distillation of water, preferably through a fractionating column. The agitated reaction mixture is heated rapidly to the temperature at which water begins to distill. As the reaction progresses the temperature is steadily increased so as to maintain steady distillation of water, preferably with some reflux through the fractionating column if a relatively volatile reactant is employed. When the distillation of water essentially ceases at a pot temperature of about 180°, the acid number of the product is checked. If it is too high, as is normally the case with polyester polyols of about 500 or greater hydroxyl equivalent weight, one of the above-described techniques is employed to drive the reaction to completion. If procedure (1) is used, the pressure is reduced gradually to 10 mm. or less while maintaining the pot temperature at about 180°. After distillation of water again ceases, the acid number is checked again. If still too high, the pot temperature then is increased to a maximum of about 240° C. and held at this level until the desired acid number is attained. In preparation of a polyester diol of 2,000 molecular weight, it is not unusual that several hours at 240° and 2 mm. Hg is required to reduce the acid number to 1.5 or less.

If technique (2) is employed, the azeotropic distillation agent may be added at the beginning of the reaction or at any later point. A Dean Stark trap is used in place of the distillation head on top of the fractionating column. The quantity of toluene (or other azeotropic distillation agent) is adjusted so as to maintain the desired boil-up rate at any given pot temperature. The final reaction temperature often will be, as in technique (2) about 240° C. The solvent is removed via vacuum stripping after a sufficiently low acid number has been obtained.

Technique (3) is effective but requires careful monitoring of the quantity of active hydrogen compound stripped from the reaction product. Tests have indicated that the overall time required for production of a polyester polyol by technique (1) is about the same as with the other two techniques, but the process is simpler due to less material handling and less critical adjustment of reaction variables.

Through the use of a suitable esterification catalyst, the time-temperature requirements for production of low-acid-number polyester polyols can be reduced. This approach suffers from the disadvantage however, that the catalyst often has an undesirable effect on the performance of the polyester polyol during subsequent preparation of polyurethane. As little as 5 parts per million of certain esterification catalysts can render a polyester diol relatively unsuitable for use in preparation of polyurethane cast elastomers, for example. Nevertheless, in many instances, residual esterification catalysts can be tolerated. In such cases they can be used to advantage in polyester polyol preparation.

The procedure for catalyzed polycondensation of 6-hydroxycaproic acids in the presence of organic polyfunctional agent is much the same as with the uncatalyzed reactions. The catalyst may be charged together with the reactants prior to heating. Some catalysts are partially or completely deactivated by prolonged exposure to water however. It is preferred to add the catalyst after most of the water of contamination has been removed, for example, after distillation of water has nearly ceased at 180° C. and atmospheric pressure. By far the greatest value of the catalyst is in reducing the remaining reaction time requirement after this point has been reached. Vacuum or azeotropic distillation or codistillation techniques may be utilized individually or in combinaton, vacuum dstillation being preferred.

A wide variety of polyesterification catalysts may be employed with tetraalkyl titanates, e.g. tetrabutyl titanate and tetraisopropyl titanate, being preferred. Other catalysts which may be used include zinc borate, lead borate, lead oxide and dibutyl tin diacetate. The catalysts are effective at concentrations as low as 5 to 20 parts per million. At higher concentrations, the required reaction time can be reduced but reactivity of the polyester polyol products becomes excessive in subsequent polyurethane preparation.

A wide variety of copolyester polyols also can be prepared from the hydrolyzates of the invention. Individual copolyester polyol products offering specific performance advantages, such as the property of having a low melting point, which facilitates handling at room temperature, or of imparting increased hydrolytic stability to derived polyurethane elastomers can be made. These copolyester polyols are prepared in the same manner described above except that a portion of the hydrolyzate is replaced by a mixture of one or more polycarboxylic acids or anhydrides thereof, with one or more polyols or other polyfunctional active hydrogen compounds, the composition of the mixture being such that the polyfunctional active hydrogen compounds are in stoichiometric excess relative to the polycarboxylic acid portion. This is necessary in order to cause the copolyester to have hydroxyl end groups. Hydroxy acids other than the hydroxycaproic acids already described, as well as their lactone derivatives, also are useful as comonomers in the preparation of the copolyester polyols.

Such copolyester polyols in the molecular weight range 1000–3000 are especially useful as intermediates for manufacture of polyurethane elastomers. For purposes of illustration, consider a polyester diol of 2000 molecular weight. If prepared, simply by reaction of, for example, 1,4-butanediol with the necessary quantity of hydrolyzate, the resulting polyester diol yields polyurethane cast elastomers of generally outstanding properties. This polyester diol, however, has a true melting point well above room temperature, and will solidify completely within a few hours when stored at 25° C. Similar polyurethane performance can be obtained, however, from a copolyester diol of 2000 molecular weight in which 35 percent by weight of the hydroxycaproic acid residues has been replaced by an equimolar mixture of ethylene glycol and 1,4-butanediol together with adipic acid in the amount required to yield a copolyester diol of the specified molecular weight. This copolyester diol, however, remains in a homogeneous liquid state for many days at 25° C., thereby greatly facilitating handling and storage. This property is invaluable in the preparation of one-shot microcellular polyurethane elastomers, for example, where it is highly desirable for reasons of controlling reactivity to mix the polyurethane reactants at room temperature.

The most useful copolyester polyols comprise from about 50 to 90 percent by weight 6-hydroxycaproic acid residues (a hydroxycaproic acid residue is essentially a molecule of hydroxycaproic acid which has given up a molecule of water in the course of being incorporated in a polyester polyol), although both higher and lower percentages of 6-hydroxycaproic acid residues are operable and useful to meet special requirements. The remaining portion of a given copolyester polyol composition can be considered, only for purposes of calculating charges, to be a polyester polyol itself. For example, the above-described copolyester diol of 2000 molecular weight can be considered to be, for purposes of calculating the charge of raw materials necessary for its preparation, a 700-molecular-weight, ethylene glycol/ butane diol/adipic acid copolyester diol which has been condensed with poly(hydroxycaproic acid) of 1300 molecular weight so as to yield a new copolyester diol of 2000 molecular weight.

The polyols and other polyfunctional active hydrogen compounds which are useful in preparation of such copolyester polyols are the same compounds which are exemplified hereinabove as end group/molecular weight controlling reactants in the preparation of ordinary polyester polyols from the hydrolyzates. If tri- or higher polyfunctional (branched) copolyester polyols are desired, these can be obtained by including a small to moderate amount of triol or other polyfunctional active hydrogen compounds in a charge consisting predominantly of diols or other suitable difunctional active hydrogen compounds.

The dicarboxylic acids which are useful include the n-alkanedioic acids,

$$HOOC(CH_2)_nCOOH$$

where $n$ may vary from one to about 20. A wide variety of other dioic acids also can be employed, such as, for example, fumaric acid, maleic acid, the phthalic acids, cylcohexanedicarboxylic acids, etc. Anhydrides such as succinic, phthalic, glutaric and maleic anhydrides also are useful. The n-alkane dioic acids containing four to ten carbon atoms are generally preferred. Branching can be brought about by inclusion of small portions of polycarboxylic acids or anhydrides, such as trimellitic acid, pyromellitic dianhydride, 1,2,4-butanetricarboxylic acid, etc.

Useful hydroxyacid comonomers include, for example, hydroxypivalic acid, 7-hydroxyheptanoic acid, and the like.

The procedure for preparing the copolyester polyols is essentially identical to the procedure which already has been described for preparation of polyester polyols by reaction of an active hydrogen compound with the hydrolyzate. All coreactants are conveniently charged to the hydrolyzate as soon as the hydrolysis is complete. Alternatively, some or all of the co-reactants may be charged prior to completion of the hydrolysis reaction, or at a later stage in polyester polyol preparation, after some polycondensation and removal of water has occurred. The detailed composition of the final polyester polyol product may be influenced, however, in terms of satistical distribution of comonomer groups and molecular weight distribution, by the choice of the point at which coreactants are charged to the reaction mixture. Generally it is preferable to charge all coreactants immediately following hydrolysis or shortly thereafter in order to avoid reducing the chances for broad molecular weight distribtion and randomization of comonomer sequences in the final product.

In a further embodiment, it is feasible to employ polycarboxylic acids such as those described above as the sole organic polyfunctional agents. Use of such acids results in acids having predominantly carboxylic acid end groups thus providing intermediates for the production of good epoxy ester derivatives which find use in forming polyurethane derivatives of this type.

As with the previously described polyester polyol preparations, these reactions may also be carried out in the presence or absence of esterification catalysts.

After the polyester polyols are prepared by the methods described above, they are admirably suited for reaction with polyisocyanates to produce polyurethanes by a third stage of the present process.

In general these procedures which are known in the art comprise reaction of the polyesters with a polyisocyanate, and also if desired, with one or more compounds containing active hydrogen.

These reactions may generally be carried out in essentially the manner already described in the prior art. The so-called "one-shot" technique, in which the polyester is reacted simultaneously with a polyisocyanate and a polyol, or the "prepolymer" technique, in which it is first reacted with a diisocyanate to lengthen the polyester chain and provide terminal isocyanate groups thereon, and the prepolymer thus prepared is then reacted with a polyol or other active hydrogen-containing compounds, may be employed.

The identity of polyisocyanates and active hydrogen-containing compounds, particularly diols, as well as the reaction conditions are well known in the art. Thus, for instance, the isocyanates may be diphenylmethane-, phenylene-, toluene-, xylylene- or dibenzylene-diisocyanates and the active hydrogen-containing compounds may be diols such as butanediol or other glycols, as well as amino alcohols and tri- or tetrafunctional compounds such as triols, tetrols, and the like. Reaction temperatures may vary between about 20 and 300° C. temperatures between about 70 and 160° C. being preferred.

As in the prior art reactions, there is oftentimes included in this reaction the necessary catalysts such as organic and inorganic derivatives of metals such as tin, lead, zinc and the like as well as organic amines such as triethyl amine, trimethyl amine and the like. In addition, if a foam product is desired, blowing agents, such as fluorocarbons may be used. Also water, emulsifiers, and other known additives may be included in small amounts by known procedures to effectively carry out this reaction.

The following examples will serve to further illustrate the advantages of the invention but are not to be considered as limitative thereon.

In the following examples, parts of each component are by weight unless otherwise indicated. Analytical procedures for the determination of acid and hydroxyl numbers were performed according to accepted ASTM methods.

EXAMPLE 1

A total of 1740 grams of 6-acetoxycaproic acid (approximately 10 moles) having a purity of 98.5% as analyzed by saponification by means of 0.5 N NaOH, is mixed with 1000 grams of water and charged into a vessel equipped with agitator, thermometer, distillation head, and distillate condenser. In addition, a total of 100 grams of Amberlite 200 sulfonic acid resin in the hydrogen form is added as the catalyst to accelerate hydrolysis of the acetoxy compounds. The ingredients are now heated to a pot temperature of about 110° to 120° C. where the distillation of a mixture of water and acetic acid commences. After about 500 grams of distillate is removed, the pot temperature reaches 140–145° C. At this point, another 2000 grams of water is charged to the reactants and the mixture is again heated to 110–120° C., while a mixture of water and acetic acid distills over. Upon removal of about 2100 grams of distillate, the pot temperature reaches again 140–145° C. A third 2000 gram portion of water is now added, the pot temperature is again increased to 110–120° C., where a mixture of water and acetic acid distills overhead. After a total of 6100 grams of distillate, consisting of water and acetic acid have been collected, the distillate is analyzed for acetic acid by means of titration with 0.5 N NaOH. Titration indicates that a total of about 590 grams of acetic acid has been collected. At this point, an additional 1000 gram portion of water is added to the pot, the reactants are again heated upwards from 110° C., while distillation takes place. After removal of 500 grams of distillate, examination of further distillate indicates that no further acetic acid distills over.

The ion exchange resin is now removed by filtration from the reactant mixture, washed with 200 grams of water, the washings being combined with the filtrate. Determination of the acid number of the filtrate indicates that the hydrolysate consists of about one third 6-hydroxycaproic acid, the other two thirds consisting of higher oligomers of this acid, even though a very substantial amount of water is present in the hydrolysate.

EXAMPLE 2

This example illustrates the uncatalyzed preparation of a 2000 molecular weight polyester diol utilizing the hydrolysate of Example 1 and 1,4-butanediol as the starting materials.

The combined hydrolysate and washings of Example 1, weighing approximately 2300 grams, are charged to an agitated reaction kettle, equipped with thermometer, a short packed fractionating column, and a distillation head on top of said column. A total of 55 grams of 1,4-butane diol is added to the hydrolysate and washings in the kettle. The reactant mixture is then upheated over a period of 7 hours to 195° C., during which time a total of 1040 grams of distillate, consisting essentially of water, are collected. The pressure is then gradually reduced by means of a mechanical vacuum pump, while a steady slow distillation of water is maintained. While the pressure is slowly reduced to 10 mm. Hg during a period of 6 hours, the temperature is gradually increased to 240° C. The vacuum is then futher reduced to 3 mm. Hg while the reactants are held for another 3 hours at 240° C., during which time the distillation of water or other distillate has ceased altogether. The total amount of distillate collected during the entire run is about 1085 grams.

The resuting polyester polyol product is allowed to cool to room temperature. The material is a waxy solid. Upon analysis of the product, the acid number is found to be about 1.5, and the hydroxyl number 55.0.

EXAMPLE 3

100 grams of the polyester described in Example 2, having a hydroxyl number of 55 and an acid number of 1.5, is admixed with 9.5 grams of 1,4-butanediol and heated to 120° C. At this temperature a total of 43 grams of p,p'-diphenylmethane diisocyanate is added to the polyester polyol-diol mixture and the reactants are agitated vigorously for several minutes, degassed, and poured into a preheated mold a soon as the mixture has reached a temperature of 140–145° C. The closed mold is kept in an air-circulating oven at 120° C. for 1 hour. After the mold is cooled, the elastomer specimen is removed, and then further cured for 12 hours at 100° C. After 1 week at ambient conditions, the resulting elastomers exhibited a tensile strength in excess of 7000 p.s.i. at an ultimate elongation of about 600%. The hardness of the product is 85 Shore A. The product has excellent resiliency and abrasion resistance.

The above elastomer can also be prepared by the prepolymer technique whereby the polyester polyol is first reacted with the diisocyanate and then with the 1,4-butanediol. The resulting elastomer exhibits also excellent tensile strength.

EXAMPLE 4

To a reaction flask equipped with agitator, thermometer, Dean-Stark trap with condenser, and nitrogen inlet tube, there is charged 960 grams (6 moles) of 6-formyloxycaproic acid having a purity of 97.9% as shown by saponification with 0.5 N NaOH. A total of 432 grams (24 moles) of water and 25.6 grams of Amberlite IR–120 sulfonic acid exchange resin in the hydrogen form, which serves as the catalyst for the hydrolysis of the ester, are added and the ingredients are heated to a temperature of about 100° C., where the distillation of the water-formic acid mixture commences. As soon as the water level drops to a point where the pot temperature increased quite rapidly to about 130–140° C., additional water is added to the hydrolyzing mixture to aid hydrolysis of the formate ester. The reaction is terminated when appearance of formic acid in the water distillate can no longer be detected by means of titration with 0.5 N NaOH. To accomplish this, a total of 7426 grams of water-formic acid distillate containing 269 grams of formic acid, is removed by distillation at pot temperatures varying from 100 to 145° C. After 269 grams of formic acid has been removed, an additional sulfonic acid resin catalyst charge of about 25 grams of Amberlite IR–120 in the hydrogen form is added to ascertain that the catalyst is still operative. However, no additional formic acid appears in the distillate. Frequently, during the addition of additional water it is observed that the reactants are insoluble as soon as a water content of in the vicinity of 1 mol or water per mol of formate ester initially charged is present. This finding shows that the hydrolysate is not merely 6-hydroxycaproic acid, but contains predominantly oligomers thereof which are no longer water soluble. The total time for the hydrolysis of the formate ester, to the point where no additional formic acid can be detected, is about 28 hours.

At the termination of the water-stripping step, a total of 43.6 grams (0.37 mole) of 1,6-hexanediol are added to the hydrolysate and the ion exchange resin is removed by filtration. The resulting filtrate weighs 759 grams. It is charged to a reaction flask equipped with agitator, nitrogen inlet tube, thermometer, and azeotroping head. The ingredients are heated from 120° C. to 240° C. over a period of 10 hours, while a total of 79 grams of aqueous distillate is removed by means of azeotroping with toluene. After removal of toluene and drying of the product at 110° C. and 1 mm. Hg for 1 hour, the polyester is analyzed. The polyester is a waxy solid, having a hydroxyl number of 24.1 and a carboxyl number of 1.9, corresponding to a molecular weight of about 4655.

EXAMPLE 5

To a reaction flask equipped with agitator, thermometer, Dean-Stark trap with condenser and nitrogen inlet tube there is charged 960 grams (6 moles) of 6-formyloxycaproic acid having a purity of 97.9% as shown by saponification with 0.5 N NaOH. A total of 1000 grams of water and 25 grams of Amberlite 200 sulfonic acid resin in the hydrogen form are charged to the hydrolyzing mixture which is heated to 100° C. where distillation of a mixture of water and formic acid commences. After a total of 850 grams of distillate is removed, fresh water is added through a dropping funnel at such a rate that the volume in the kettle remains approximately constant while distillate is continuously removed. The rate of distillation and addition of fresh water is regulated to result in a homogeneous phase in the kettle at a kettle temperature of from 120 to 130° C. In this manner, there is removed a total of 600 grams of distillate including the first 850 grams of distillate, said distillate containing 270 grams of formic acid as determined by titration with 0.5 N NaOH. The total hydrolysis time until no further formic acid is detected in the distillate is about 20 hours.

It is obviously evident that even faster hydrolysis can be achieved by operating at still higher temperature under pressure, optionally steam-distilling the formic acid.

The above hydrolysate which consists of some 6-hydroxycaproic acid and very substantial quantities of higher oligomers thereof, as shown by the insolubility of the hydrolysate upon dilution with water, is freed from the ion exchange resin by means of filtration, the filter cake is washed with 300 grams of water, and the filtrate and washings are collected and charged to a reaction flask. Said reaction flask is equipped with an agitator, a thermometer, a 300 mm. packed fractionating column, and a distillation head on top of said column. To the hydrolysate and washings there is added 35 grams of 1,4-butanediol. The reactant mixture is then upheated over a period of 5 hours to a temperature of 220° C. while excess water and water of condensation are removed through the column. The column serves to retain the 1,4-butanediol in the kettle. Thereafter, the reactants are slowly up-heated to 240° C. over a period of 5 hours while a vacuum of as low as 3 mm. Hg is applied.

The resulting polyester is a waxy solid at room temperature having a carboxyl number of 1.7 and a hydroxyl number of 56.5 corresponding to a calculated molecular weight of about 1930.

A 300 gram portion of this polyester is reacted with 59.4 grams of an 80:20 isomer mixture of 2,4- and 2,6-toluene diisocyanates at a temperature of 80° C. for a period of 3 hours under an atmosphere of dry nitrogen. The resulting solid isocyanate-terminated reaction product has an NCO content of 4.1% by weight.

A total of 100 grams of this isocyanate-terminated reaction product is heated to 80° C. and intimately mixed with 13 grams of 4,4'-methylene bis(o-chloroaniline) which has been preheated to 121° C., for a period of 2 minutes. During this time, the reactants are subjected to a vacuum of 2 mm. Hg to effect degassing of the mixture before casting. The reacting mixture is quickly cast into a metal mold which has been preheated to 100° C. The elastomer is further cured for 10 hours at 100° C.

Examination of the physical properties showed a hardness of 85 Shore A, and a tensile strength in excess of 6000 p.s.i. at an ultimate elongation of about 500%.

EXAMPLE 6

To a reaction flask equipped with agitator, thermometer, nitrogen inlet tube, and a Dean Stark trap equipped with reflux condenser there are charged 2423 grams of methyl 6-hydroxycaproate, shown by hydroxyl analysis to have a purity of 96.7%, 576 grams of water and 60 grams of Amberlite IR-120 sulfonic acid exchange resin in the hydrogen form. The reactants are heated to a temperature of 100° C. where the codistillation of water and methanol commences. As the water of distillation and the methanol are removed, fresh water is replenished and the hydrolysis is conducted at a kettle temperature of from 100 to 125° C. while water and methanol are continuously removed overhead. The appearance of methanol in the distillate is monitored by means of vapor phase chromatography. After a total of 5472 grams of water, including the 576 grams thereof originally charged, are added and a total of 5796 grams of distillate has been removed continuously, the appearance of methanol in the distillate as observed by vapor phase chromatography, is negligible. The total hydrolysis time of the above run is approximately 24 hours.

Surprisingly, only a relatively small amount of 6-hydroxycaproic acid is formed during this hydrolysis, the majority of the hydrolysate being higher oligomers as shown by the insolubility of the resulting hydrolysate in water. However, the crude oligomer mixture is suitable for conversion to a polyester without further purification.

The hydrolysate is freed from the ion-exchange resin by means of filtration, a total of 1950 grams of product being collected.

A total of 1900 grams of the above hydrolysate, 191 grams of diethylene glycol, and 0.01 gram of stannous octoate polyesterification catalyst, corresponding to 5 parts per million based on the weight of reactants, are charged to a reaction flask equipped with agitator, thermometer, nitrogen inlet tube, and a Dean-Stark trap fitted with a reflux condenser. The ingredients are upheated to 240° C. over a period of 8 hours while a total of 134 grams of distillate, predominantly water, is collected. Upon analysis, the resulting polyester which is a waxy solid at room temperature has an acid number of 0.5, and a hydroxyl number of 88.4, corresponding to a molecular weight of about 1270.

A total of 300 grams of the above polyester is reacted with 75 grams of an 80:20 isomer mixture of 2,4- and 2,6-toluene diisocyanates at a temperature of 95° C. for a period of 1 hour under an atmosphere of dry nitrogen. The resulting isocyanate-terminated reaction product has an NCO content of 4.13% by weight.

A total of 110 grams of the above isocyanate-terminated reaction product is reacted with 13 grams of 4,4'-methylene bis(o-chloroaniline) as described in Example 6 and cast into an elastomer. The sample is held for a total of 45 minutes at 120° C., and then for 1.25 hours at 100° C. It is allowed to cure further at room temperature for 72 hours before being tested. The elastomer exhibited the following physical properties:

| Property | Value | ASTM method |
|---|---|---|
| Shore Hardness, A | 85 | D 1484-59. |
| Modulus, 100% elongation, p.s.i | 666 | D 412-61 T. |
| Modulus, 200% elongation, p.s.i | 889 | 20 in./minute. |
| Modulus, 300% elongation, p.s.i | 1,333 | Do. |
| Modulus, 400% elongation, p.s.i | 2,333 | Do. |
| Modulus, 500% elongation, p.s.i | 4,667 | Do. |
| Tear strength, p.l.i | 392 | D 624-54 Die C. |
| Ultimate strength, p.s.i | 6,222 | D 412-61 T. |
| Ultimate elongation, percent | 575 | D 412-61 T. |
| Thickness, in | 0.072 | |

It is apparent that various modifications of the present invention will become apparent to those skilled in the art upon reading this description. Therefore all such obvious modifications are intended to be included within the scope of the invention as defined by the appended claims.

What is claimed is:

1. A process for the production of polyurethanes which comprises reacting a compound selected from the group consisting of 6-acyloxycaproic acids and lower alkyl 6-hydroxycaproates, with water, at an elevated temperature; removing the acids or alkanols formed during the reaction to produce a hydrolysate mixture of 6-hydroxycaproic acid and oligomers thereof; reacting said mixture with organic polyfunctional agents or mixtures thereof to produce a polyester polyol intermediate and thereafter converting the polyester polyol to polyurethanes by reaction with polyisocyanates.

2. A process for preparing a hydrolyzate mixture of 6-hydroxycaproic acid and oligomers thereof which comprises reacting 6-acyloxycaproic acids or alkyl 6-hydroxycaproates with water, at an elevated temperature, and removing the acid or alkanol formed during the reaction, thereby producing said hydrolyzate mixture.

3. The process of claim 2 wherein said 6-acyloxycaproic acid is reacted with water and the acid formed during the reaction is removed from the reaction zone.

4. The process of claim 2 wherein said alkyl 6-hydroxycaproate is reacted with water and the alkanol formed during the reaction is removed from the reaction zone.

5. A process according to claim 2 wherein the hydrolysis reaction is effected with about 0.1 to 5 moles of water per mole of 6-acyloxycaproic acid or alkyl 6-hydroxycaproate.

6. A process according to claim 2 wherein the hydrolysis reaction is conducted in the presence of a catalyst which yields hydrogen-ions on contact with water.

7. A process for the production of polyesterpolyols which comprises reacting a compound selected from the group consisting of 6-acyloxycaproic acids or alkyl 6-hydroxycaproates, with water, at an elevated temperature; removing the acids or alkanols formed during the reaction to produce a hydrolysate mixture of 6-hydroxycaproic acid and oligomers thereof; polycondensing said hydrolyzate mixture with polyols, polyamines, aminoalcohols, or mixtures thereof to produce said polyesterpolyols.

References Cited

UNITED STATES PATENTS

| | | |
|---|---|---|
| 2,534,255 | 12/1950 | Filachione et al. |
| 2,933,478 | 4/1960 | Young et al. |
| 3,055,869 | 9/1962 | Wilson et al. |
| 2,914,556 | 11/1959 | Hostettler et. al. _____ 260—484 |

M. J. WELSH, Primary Examiner

H. S. COCKERAM, Assistant Examiner

U.S. Cl. X.R.

260—78.3 R